US011891784B2

(12) United States Patent
Hu et al.

(10) Patent No.: US 11,891,784 B2
(45) Date of Patent: Feb. 6, 2024

(54) SHOWER DEVICE

(71) Applicant: Xiamen Solex High-Tech Industries Co., Ltd., Xiamen (CN)

(72) Inventors: Youxian Hu, Xiamen (CN); Donghai Chen, Xiamen (CN); Xiaolong Lin, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 167 days.

(21) Appl. No.: 17/242,754

(22) Filed: Apr. 28, 2021

(65) Prior Publication Data

US 2021/0246640 A1 Aug. 12, 2021

Related U.S. Application Data

(63) Continuation-in-part of application No. 16/999,229, filed on Aug. 21, 2020, now Pat. No. 11,590,526.

(30) Foreign Application Priority Data

Aug. 21, 2019 (CN) ........................ 201921361071.9
Mar. 17, 2021 (CN) ........................ 202120552282.1

(51) Int. Cl.
*E03C 1/06* (2006.01)
*B05B 1/18* (2006.01)
*B05B 15/62* (2018.01)

(52) U.S. Cl.
CPC .................. *E03C 1/06* (2013.01); *B05B 1/18* (2013.01); *B05B 15/62* (2018.02)

(58) Field of Classification Search
CPC .............. E03C 1/06; B05B 1/18; B05B 15/62
See application file for complete search history.

(56) References Cited

U.S. PATENT DOCUMENTS 11,383,260 B2 * 7/2022 Berlovan, Jr. .......... B05B 15/62
2019/0299224 A1 * 10/2019 Wu ........................... B05B 1/16

FOREIGN PATENT DOCUMENTS

KR 20120090416 A * 2/2011

* cited by examiner

*Primary Examiner* — Qingzhang Zhou
(74) *Attorney, Agent, or Firm* — Cooper Legal Group LLC

(57) ABSTRACT

The present disclosure discloses a shower device. The shower device comprises a handheld shower head, a bracket, a first hanging structure, and a second hanging structure. The first hanging structure is disposed between opposite sides of a back of the handheld shower head and the bracket to enable the back of the handheld shower head to be detachably coupled to the bracket. The bracket comprises the second hanging structure, and the second hanging structure is configured to enable a handle of the handheld shower head to be detachably coupled to the bracket.

12 Claims, 23 Drawing Sheets

SHOWER DEVICE

RELATED APPLICATIONS

This application is a continuation-in-part of U.S. application Ser. No. 16/999,229, filed on Aug. 21, 2020, which claims priority to Chinese patent application number 201921361071.9, filed on Aug. 21, 2019. This application also claims priority to Chinese patent application number 202120552282.1, filed on Mar. 17, 2021. U.S. application Ser. No. 16/999,229 and Chinese patent application numbers 201921361071.9 and 202120552282.1 are incorporated herein by reference.

FIELD OF THE DISCLOSURE

The present disclosure relates to a shower device, and more particularly to a hanging structure of a handheld shower head.

BACKGROUND OF THE DISCLOSURE

Shower devices provided with a magnetic hanging mechanism have proven successful on the market. The shower devices comprise a handheld shower head and a bracket. One of the handheld shower head and the bracket is disposed with a powerful magnet, and the other one of the handheld shower head and the bracket is disposed with iron sheet. The iron sheet is attached to the powerful magnet to enable the handheld shower head to be detachably coupled to the bracket. However, the cost of powerful magnet is high, and the instantaneous impact between the handheld shower head and the bracket may produce a large noise, which affects user experience.

Furthermore, when the handheld shower head is hung to the bracket, a height of the handheld shower head cannot be adjusted according to a height of a user. It is inconvenient for a user who is the shortest person in a family to use the handheld shower head because the height of the handheld shower head must be greater than the tallest person in the family to meet the needs of the whole family.

BRIEF SUMMARY OF THE DISCLOSURE

The present disclosure provides a shower device to solve the deficiencies in the background.

In order to solve the technical problem, a technical solution of the present disclosure is as follows.

A shower device comprises a handheld shower head, a bracket, a first hanging structure, and a second hanging structure. The first hanging structure is disposed between opposite sides of a back of the handheld shower head and the bracket to enable the back of the handheld shower head to be detachably coupled to the bracket. The bracket comprises the second hanging structure, and the second hanging structure is configured to enable a handle of the handheld shower head to be detachably coupled to the bracket.

In a preferred embodiment, the first hanging structure is disposed on a front surface of the bracket and the back of the handheld shower head, and the second hanging structure is disposed on a side surface of bracket.

In a preferred embodiment, the first hanging structure comprises a hanging sleeve disposed on the back of the handheld shower head and a hanging hook disposed on the bracket. The hanging sleeve comprises an accommodating chamber, a lower part of the accommodating chamber comprises an opening surface, a first side of the accommodating chamber facing the bracket is disposed with a baffle, and the baffle comprises a notch extending toward a top end surface of the baffle. The hanging hook comprises a first portion configured to be disposed in the accommodating chamber, a second portion configured to be disposed in the notch, and a third portion connected to a side of the second portion away from the first portion. The second portion is disposed on a side of the first portion away from the hanging sleeve, and at least part of the second portion is recessed relative to the first portion and the third portion to define a groove between the first portion and the third portion.

In a preferred embodiment, during a hanging process of the hanging hook and the hanging sleeve, the first portion is disposed in the accommodating chamber prior to the second portion being disposed in the notch.

In a preferred embodiment, the at least part of the second portion that is recessed relative to the first portion and the third portion is an upper part of the second portion, and the groove is defined between the first portion and an upper part of the third portion.

In a preferred embodiment, an upper part of the third portion is recessed with a space-providing opening for increasing an opening width of an entrance of the groove.

In a preferred embodiment, the first hanging structure comprises a rib disposed on the back of the handheld shower head and a slot disposed on the bracket, and the slot has a gradually narrowed shape extending along an insertion direction of the rib.

In a preferred embodiment, the first hanging structure comprises a hanging sleeve disposed on the back of the handheld shower head and one or more hanging hooks disposed on the bracket, the hanging sleeve comprises an arc-shaped hanging groove, an upper end of the one or more hanging hooks is attached on an upper end of an inner wall of the arc-shaped hanging groove, and movement of the one or more hanging hooks is limited in an insertion direction of the arc-shaped hanging groove.

In a preferred embodiment, the one or more hanging hooks are two hanging hooks disposed in the arc-shaped hanging groove along both sides of an axial direction of the arc-shaped hanging groove.

In a preferred embodiment, the first hanging structure comprises a positioning pin and a positioning hole, and when the handheld shower head is hung to the bracket, the positioning pin is positionally coupled to the positioning hole.

Compared with the existing techniques, the technical solution has the following advantages.

1. Through the cooperation of the bracket and the handheld shower head, the handle or back of the handheld shower head can be hung to the bracket. In this way, height adjustment of the handheld shower head can be realized so that when people with different heights take a shower, the handheld shower head can be adjusted to a suitable height and the user experience can be improved.

2. During a hanging process of the hanging hook and the hanging sleeve, the first portion of the hanging hook is disposed in the accommodating chamber prior to the second portion of the hanging hook being disposed in the notch. The second portion of the hanging hook can be smoothly disposed in the notch to complete the hanging process due to a guiding action between the first portion of the hanging hook and the accommodating chamber.

3. The upper part of the third portion of the hanging hook is recessed with an opening for increasing a width of an entrance of the groove and increasing a range of the mounting angle of the handheld shower head and the bracket, which makes it easier for a user to perform the hanging process between the handheld shower head and the bracket.

4. In order to increase the guiding action during the entire hanging process, there are a total of three guiding processes that are separately performed during the hanging process. This prevents the handheld shower head from shaking after being hung to the bracket and ensures that the handheld shower head can be smoothly hung to the bracket.

5. When the handheld shower head is hung in place, the positioning hole of the hanging hook is coupled to the positioning pin to generate a prompt sound for reminding the user that the handheld shower head is hung up.

DETAILED DESCRIPTION OF THE EMBODIMENTS

Figure 1:
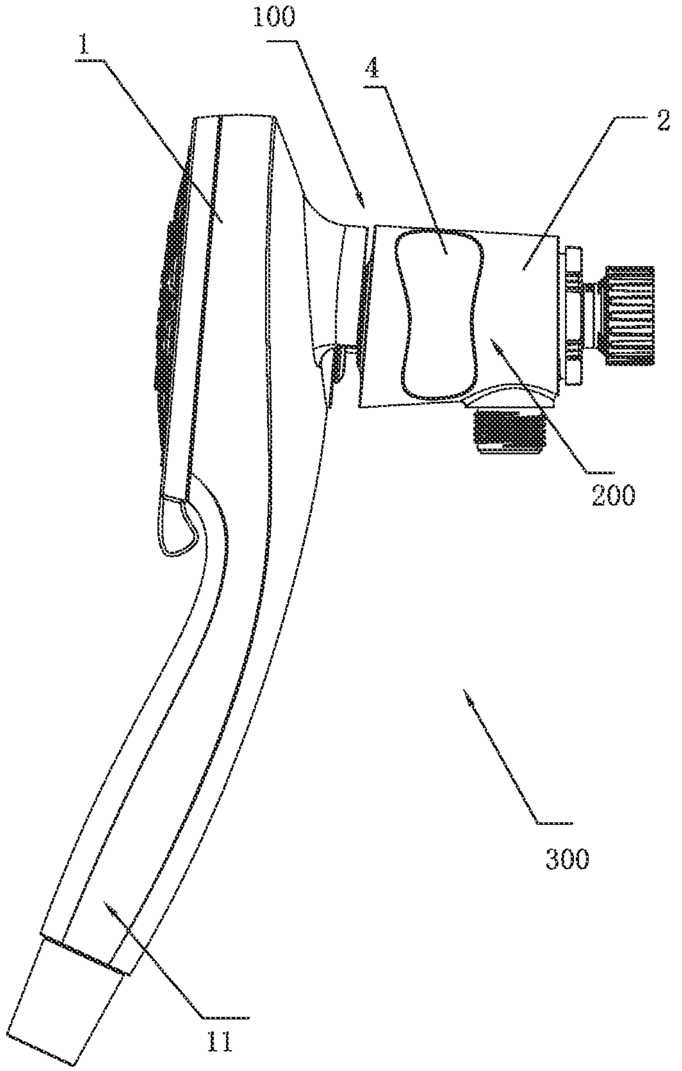
FIG. 1 illustrates a side view of a shower device according to embodiment 1 when a back of a handheld shower head is hung to a bracket.
Figure 2:
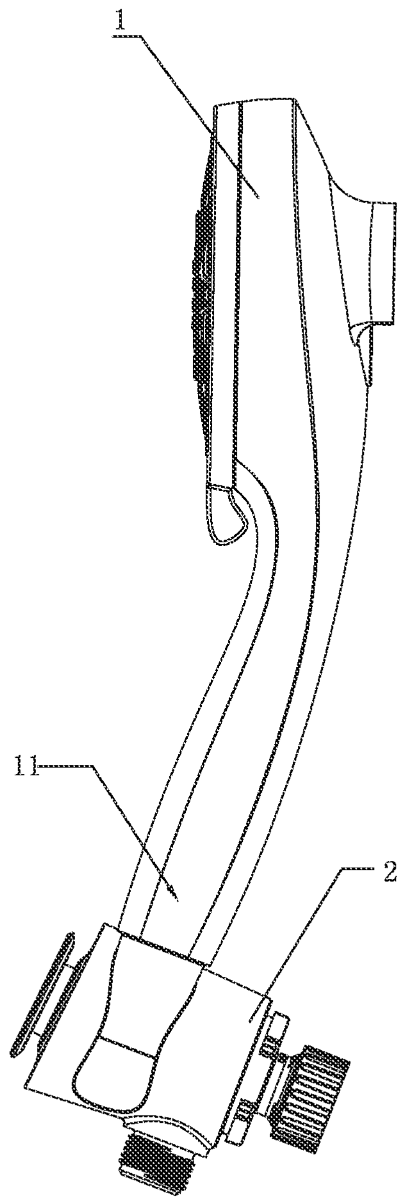
FIG. 2 illustrates a side view of the shower device according to embodiment 1 when a handle of the handheld shower head is hung to the bracket.
Figure 3:
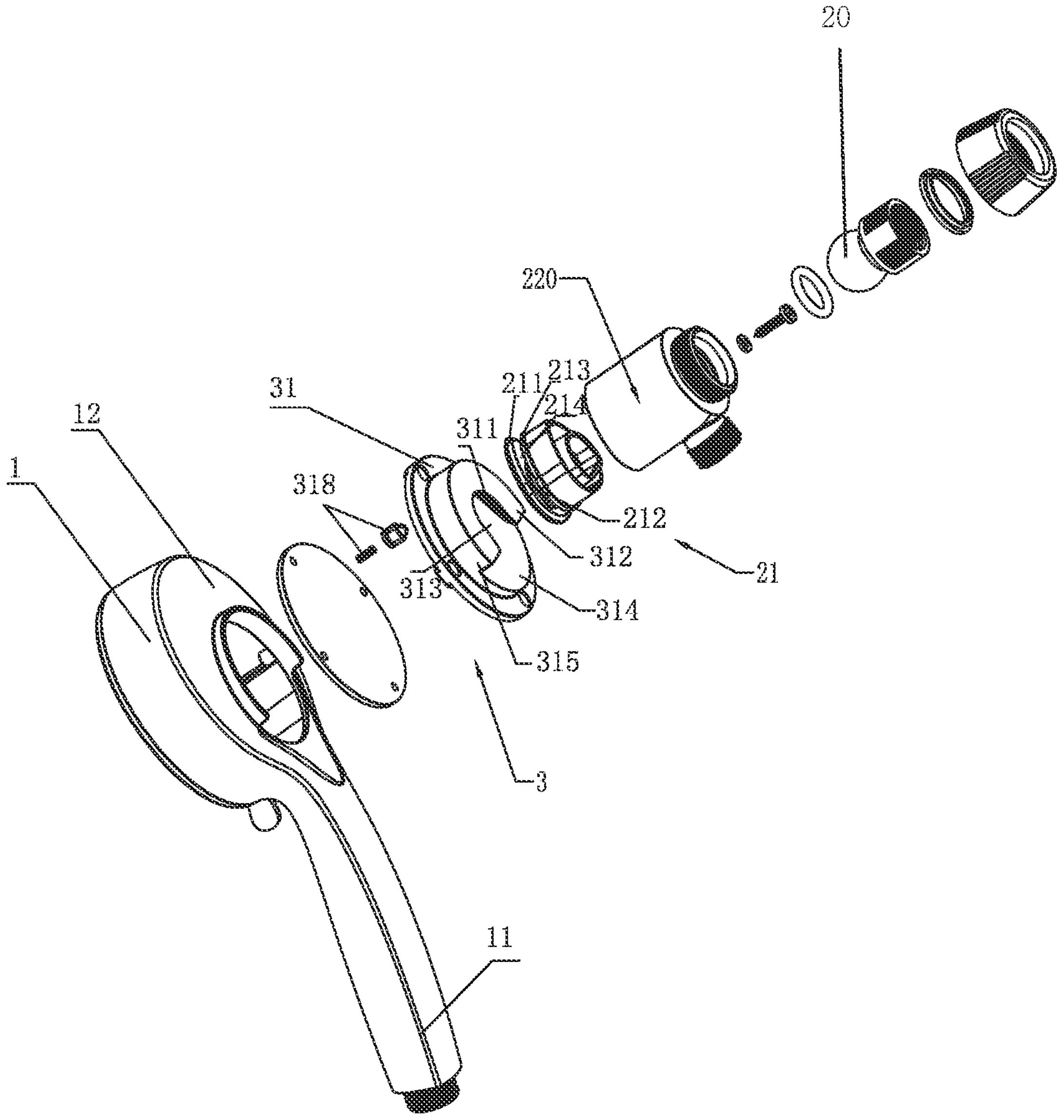
FIG. 3 illustrates an exploded diagram of the handheld shower head and the bracket according to embodiment 1.

The present disclosure will be further described below in combination with the accompanying drawings and embodiments.

Embodiment 1

Referring to FIGS. 1-19, a shower device 300 is provided. The shower device 300 comprises a handheld shower head 1 and a bracket 2 disposed on a wall surface or in communication with a water source.

A first hanging structure 100 is disposed between opposite sides of a back 12 of the handheld shower head 1 and the bracket 2 to enable the back 12 of the handheld shower head 1 to be detachably coupled to the bracket 2. The bracket 2 has a second hanging structure 200 configured to enable a handle 11 of the handheld shower head 1 to be detachably coupled to the bracket 2.

In this embodiment, the first hanging structure 100 is disposed on a front surface 210 of the bracket 2 (e.g., facing a user) and the back 12 of the handheld shower head 1. The second hanging structure 200 is disposed on a side surface 220 of the bracket 2.

In abovementioned shower device 300, the back 12 of the handheld shower head 1 or the handle 11 of the handheld shower head 1 is detachably coupled to the bracket 2 through a cooperation of the bracket 2 and handheld shower head 1. When people of different heights take a shower, the handheld shower head 1 can be adjusted to a suitable height, which can improve user experience.

In this embodiment, the first hanging structure 100 comprises a hanging portion 3 disposed on a side of the handheld shower head 1 facing the bracket 2.

Opposite sides of the hanging portion 3 and the bracket 2 respectively comprise a hanging sleeve 31 and a hanging hook 21 so as to define a detachable hanging connection. In some embodiments, positions of the hanging sleeve 31 and the hanging hook 21 can also be interchanged. That is, the hanging sleeve 31 may be disposed on the bracket 2, and the hanging hook 21 may be disposed on the hanging portion 3. This simple variation of this embodiment is not described herein.

Specifically, the hanging sleeve 31 comprises an accommodating chamber 311. A lower part of the accommodating chamber 311 comprises an opening surface 319, and a first side of the accommodating chamber 311 facing the bracket 2 is disposed with a baffle 312. The baffle 312 comprises a notch 313 extending toward a top end surface of the baffle 312. A second side of accommodating chamber 311 away from (e.g., opposite to) the baffle 312 is disposed with a back plate 314, and a left side and a right side of the baffle 312 extend toward the back plate 314 to define a connecting plate 315 connected to the back plate 314. The baffle 312 cooperates with the back plate 314 and the connecting plate 315 to define the accommodating chamber 311.

The hanging hook 21 comprises a first portion 211 configured to be disposed in the accommodating chamber 311 and a second portion 212 configured to be disposed in the notch 313.

Specifically, the second portion 212 is disposed on a side of the first portion 211 away from the hanging sleeve 31, and a side of the second portion 212 away from the first portion 211 is connected to a third portion 213 of the hanging hook 21. The second portion 212 is entirely recessed relative to the first portion 211 and the third portion 213 to define a groove 214 between an upper part of the first portion 211 and the third portion 213. In this embodiment, the groove 214 surrounds a whole circumference of the second portion 212 in a circumferential direction. In some embodiment, it is only necessary to ensure that the groove 214 is defined between the first portion 211 and the third portion 213, so the second portion 212 is partially recessed relative to the first portion 211 and the third portion 213 to define the groove 214.

During a hanging process of the hanging hook 21 and the hanging sleeve 31, the first portion 211 is disposed in the accommodating chamber 311 before the second portion 212 is disposed in the notch 313. The second portion 212 can be smoothly disposed in the notch 313 to complete the hanging process due to a guiding action between the first portion 211 and accommodating chamber 311.

An upper part of the third portion 213 is recessed with a space-providing opening 215 for increasing an opening width of the groove 214 and increasing a range of a mounting angle of the handheld shower head 1 and bracket 2, which makes it easier for a user to complete the hanging process between the handheld shower head 1 and the bracket 2.

In this embodiment, in order to increase the guiding action during the hanging process, there are a total of three guiding processes that are separately performed during the hanging process. The following three guiding processes are described in detail.

A first guiding process: a side of the upper part of the first portion 211 facing the hanging sleeve 31 is disposed with a first guiding surface 216. The side of accommodating chamber 311 away from the baffle 312, that is the back plate 314 mentioned above, defines a guide mating surface coupled to the first guiding surface 216. In this embodiment, the first guiding surface 216 is inclined. The first guiding surface 216 abuts the back plate 314, and then the back plate 314 slides downward relative to the first guiding surface 216 due to the first guiding surface 216 being inclined, so that the first portion 211 gradually enters into the accommodating chamber 311 of the hanging sleeve 31. Thereby, the first guiding process is completed.

A second guiding process: an inner side wall of the baffle 312 facing the accommodating chamber 311 is disposed with a second guiding surface 316. A side of the first portion 211 facing the groove 214 is disposed with a second guide mating surface 217 coupled to the second guiding surface 316. In this embodiment, the second guiding surface 316 and the second guide mating surface 217 are both vertical planes for being guided by a front side and a rear side of the first portion 211 and gradually straightening an inclined angle of the handheld shower head 1. It is ensured that the first portion 211 can smoothly enter the accommodating chamber 311. Thereby, the second guiding process is completed.

A third guiding process: the baffle 312 comprises a third guiding surface 317 on two sides of a lower end of the notch 313. An upper end of the second portion 212 comprises a third guide mating surface 218 coupled to the third guiding surface 317. In this embodiment, the third guiding surface 317 and the third guide mating surface 218 are arc-shaped surfaces. The third guiding process is intend to ensure that the second portion 212 can smoothly enter the notch 313.

In this embodiment, the accommodating chamber 311 gradually and upwardly narrows in a width direction (e.g., measured along the z-axis in FIG. 9) and a thickness direction (e.g., measured along the y-axis in FIG. 9) from the opening surface 319. Correspondingly, the first portion 211 has a wedge shape. When the first portion 211 is disposed in the accommodating chamber 311, the first portion 211 corresponds to the gradually narrowed shape of the accommodating chamber 311 to enable a position of the handheld shower head 1 to be automatically aligned.

In addition, left and right sides of the second portion 212 are respectively disposed with first straight portions 2121, and left and right sides of notch 313 are respectively disposed with second straight portions 3131 coupled to the first straight portion 2121 for preventing the second portion 212 from rotating in the notch 313. This prevents the handheld shower head 1 from shaking after being hung to the bracket 2.

Finally, a side of the accommodating chamber 311 away from the baffle 312 is further disposed with a positioning pin 318, and the first portion 211 comprises a positioning hole 219 coupled to the positioning pin 318.

The following is a detailed description of three stages of the hanging process of the handheld shower head 1 and the bracket 2 in conjunction with FIGS. 4-13.

A first stage: the handheld shower head 1 is inclined close to the bracket 2 to enable the hanging hook 21 to be disposed in the hanging sleeve 31.

Figure 4:
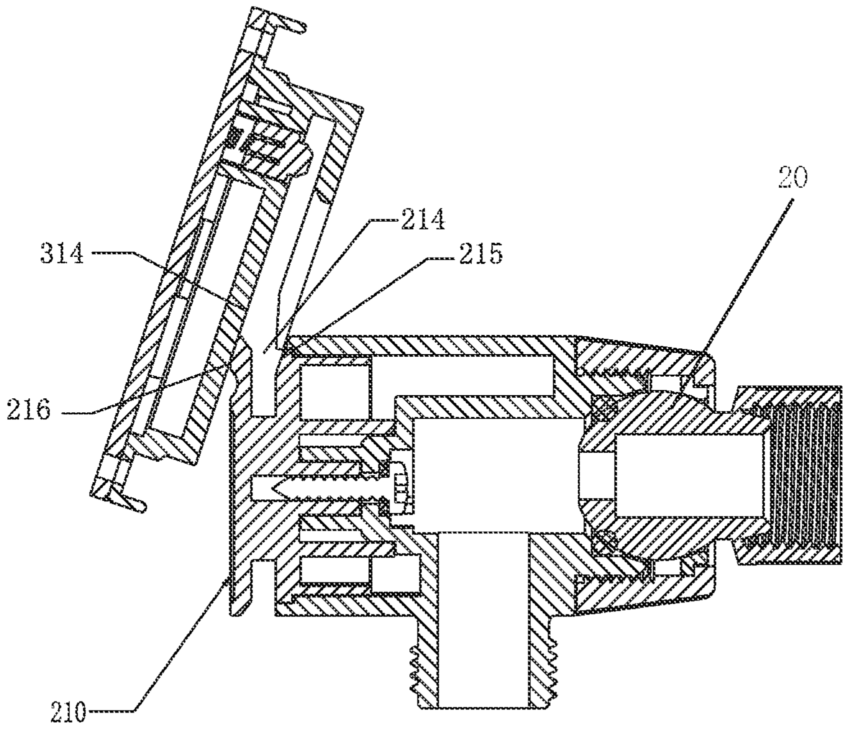
FIGS. 4-8 illustrate cross-sectional views of a hanging portion and the bracket during a hanging process according to embodiment 1.
Figure 5:
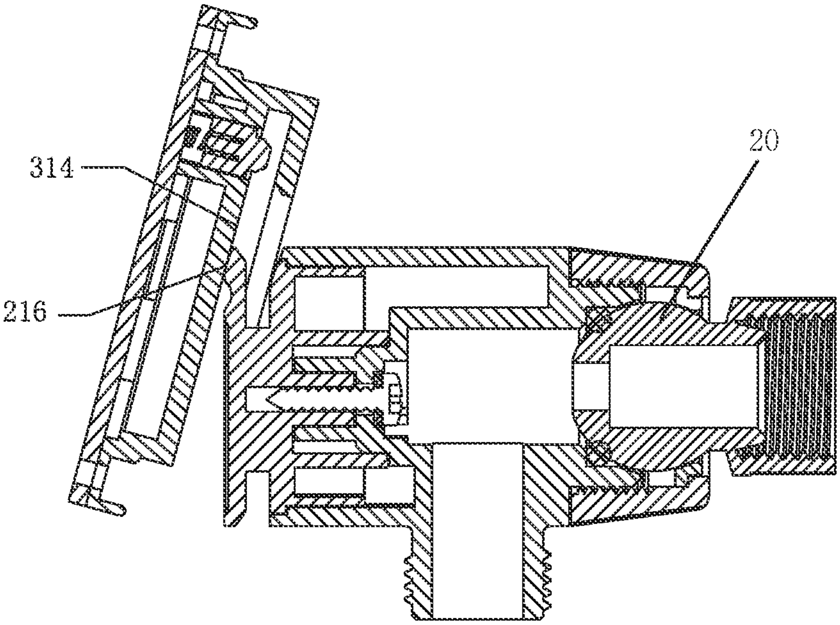

Referring to FIGS. 4-5, when the handheld shower head 1 is inclined close to the bracket 2, the first guiding surface 216 abuts the back plate 314, and the handheld shower head 1 moves downward along the first guiding surface 216 to enable the hanging hook 21 to be disposed in the hanging sleeve 31.

A second stage: the handheld shower head 1 is centered from a left side and a right side due to the second guiding surface 316 and the second guide mating surface 217, and the inclined angle thereof is gradually smaller until perpendicular to the bracket 2 due to the second guiding surface 316.

Referring to FIGS. 6, and 11-13, the handheld shower head 1 is guided by the second guiding surface 316 during a falling process of the handheld shower head 1, and the inclined angle of the handheld shower head 1 is gradually smaller until the handheld shower head 1 is perpendicular to the bracket 2; the third guiding surface 317 cooperates with the third guide mating surface 218 to center the handheld shower head 1 in a vertical direction.

Figure 6:
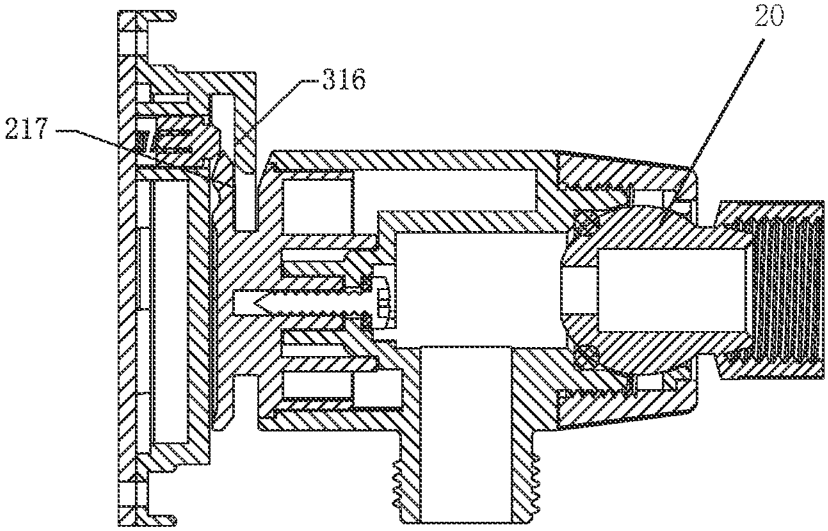
Figure 7:
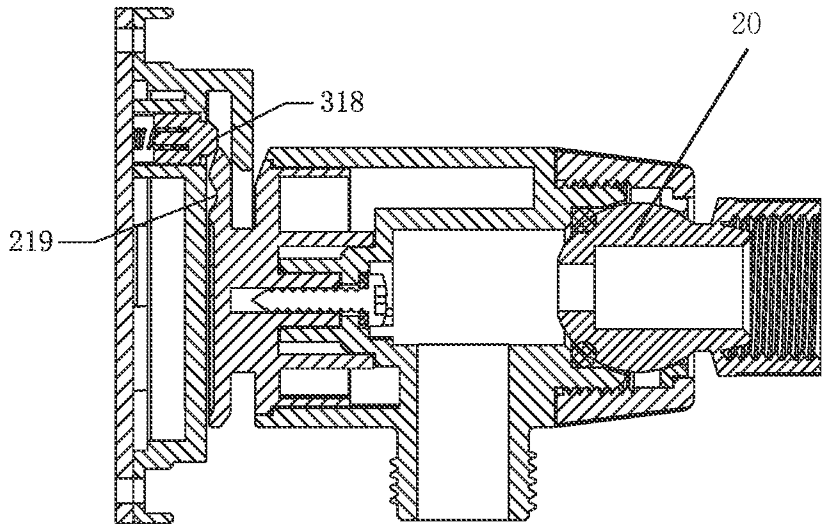
Figure 8:
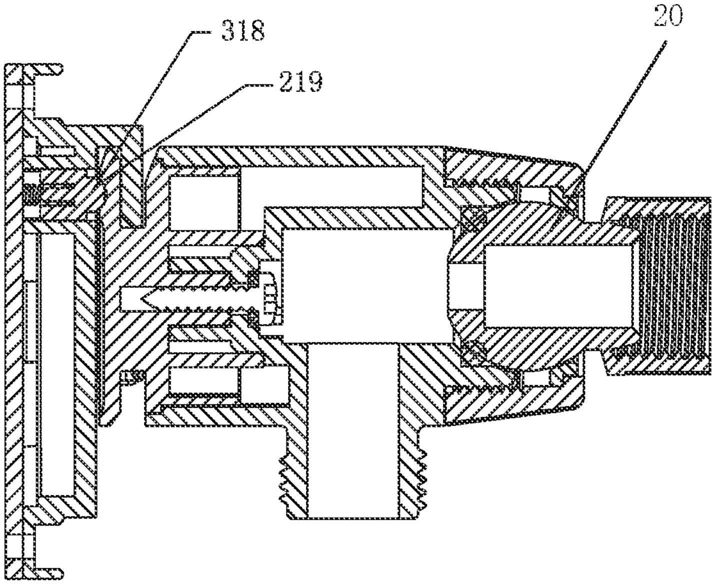
Figure 9:
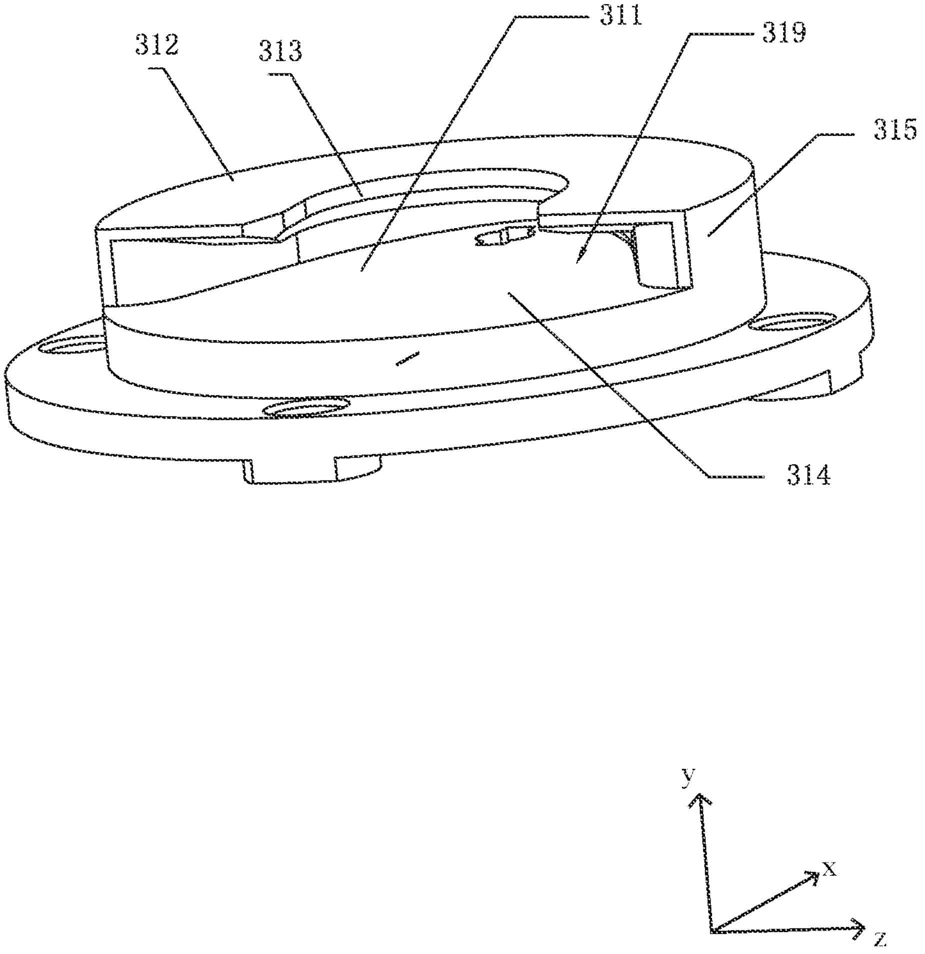
FIG. 9 illustrates a perspective view of a hanging sleeve according to embodiment 1.
Figure 10:
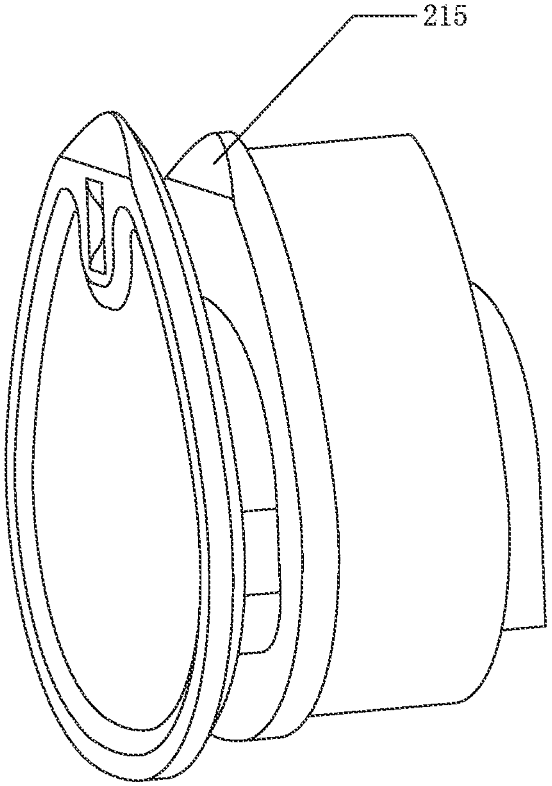
FIG. 10 illustrates a perspective view of a hanging hook according to embodiment 1.
Figure 11:
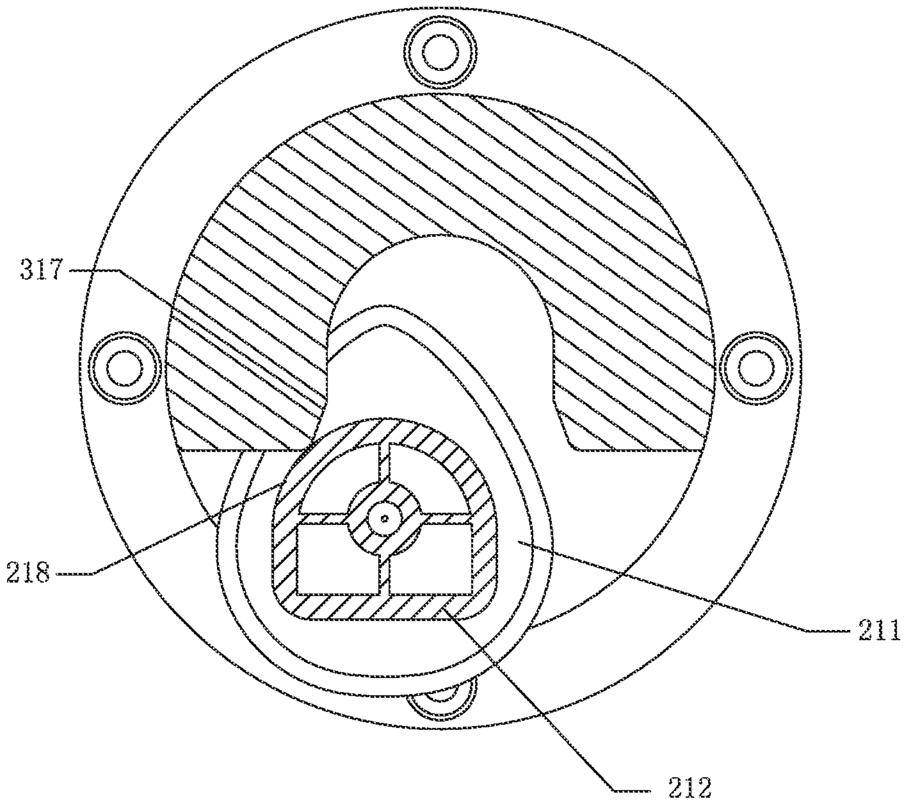
FIGS. 11-13 illustrate process diagrams of the hanging sleeve and the hanging hook when a first portion of the hanging hook and a second portion of the hanging hook are disposed in the hanging sleeve according to embodiment 1.
Figure 12:
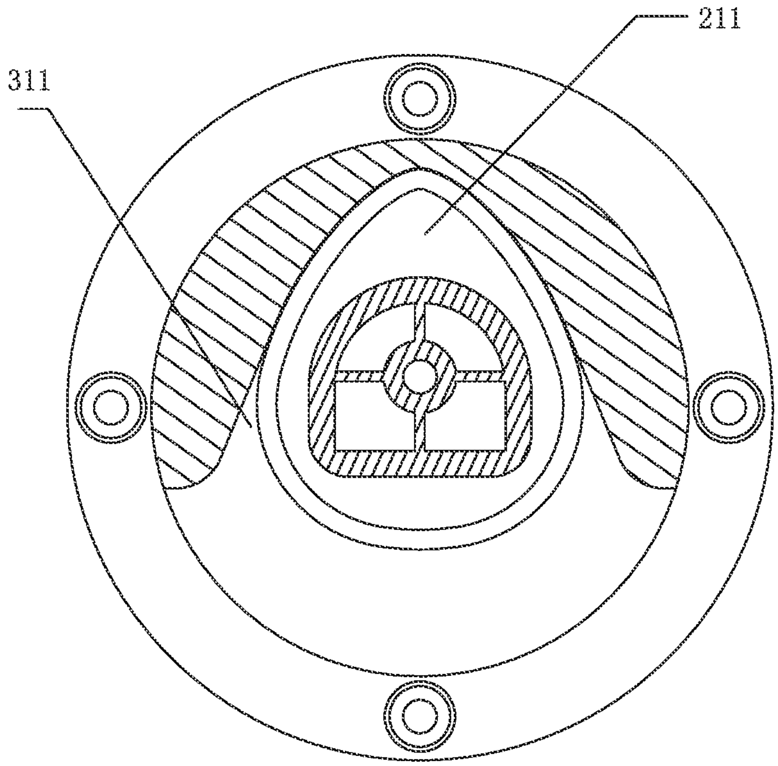
Figure 13:
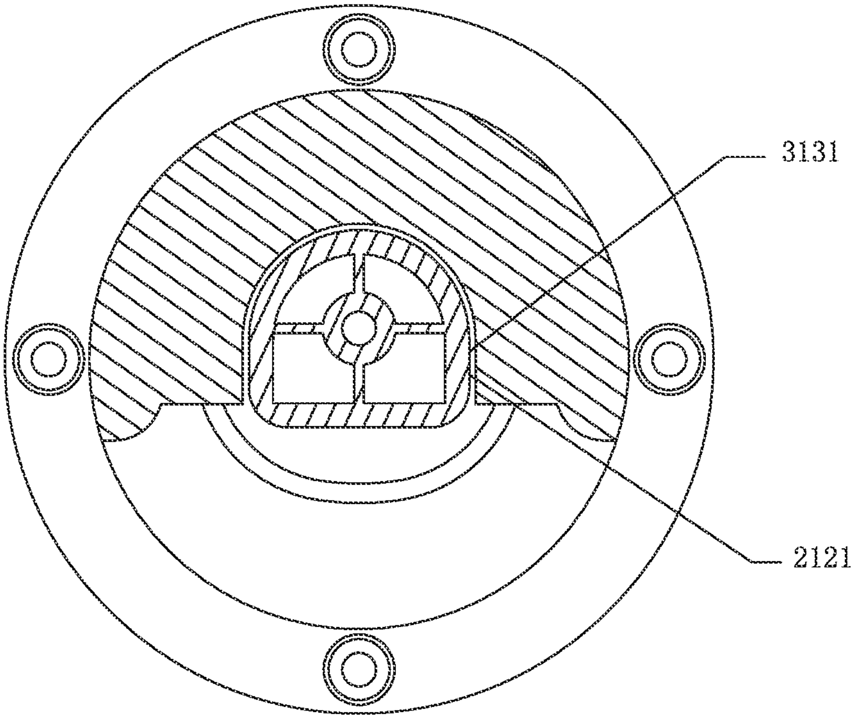
Figure 14:
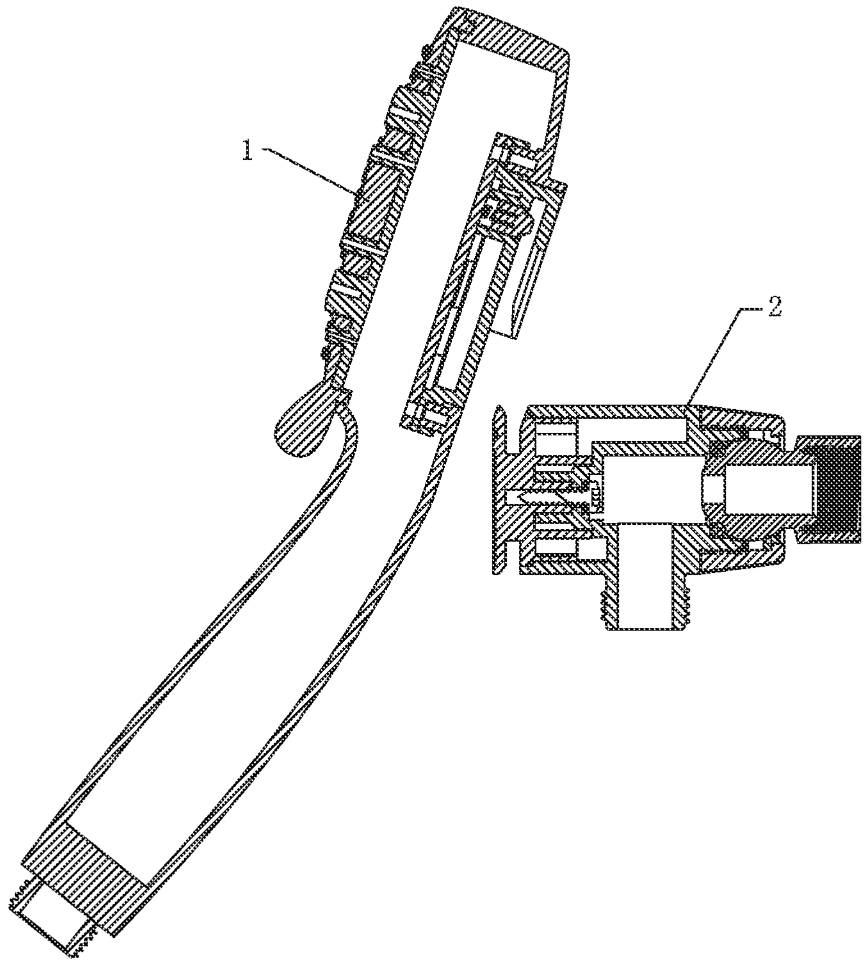
FIGS. 14-19 illustrate process diagrams of the handheld shower head and the bracket according to embodiment 1.
Figure 15:
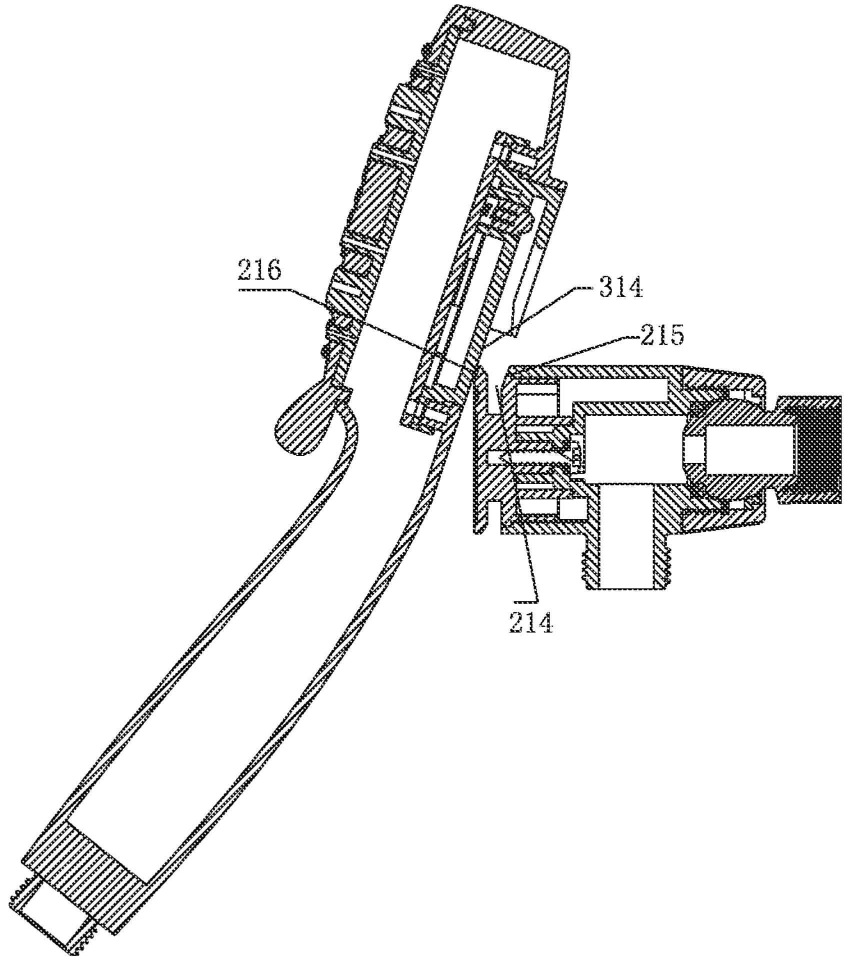
Figure 16:
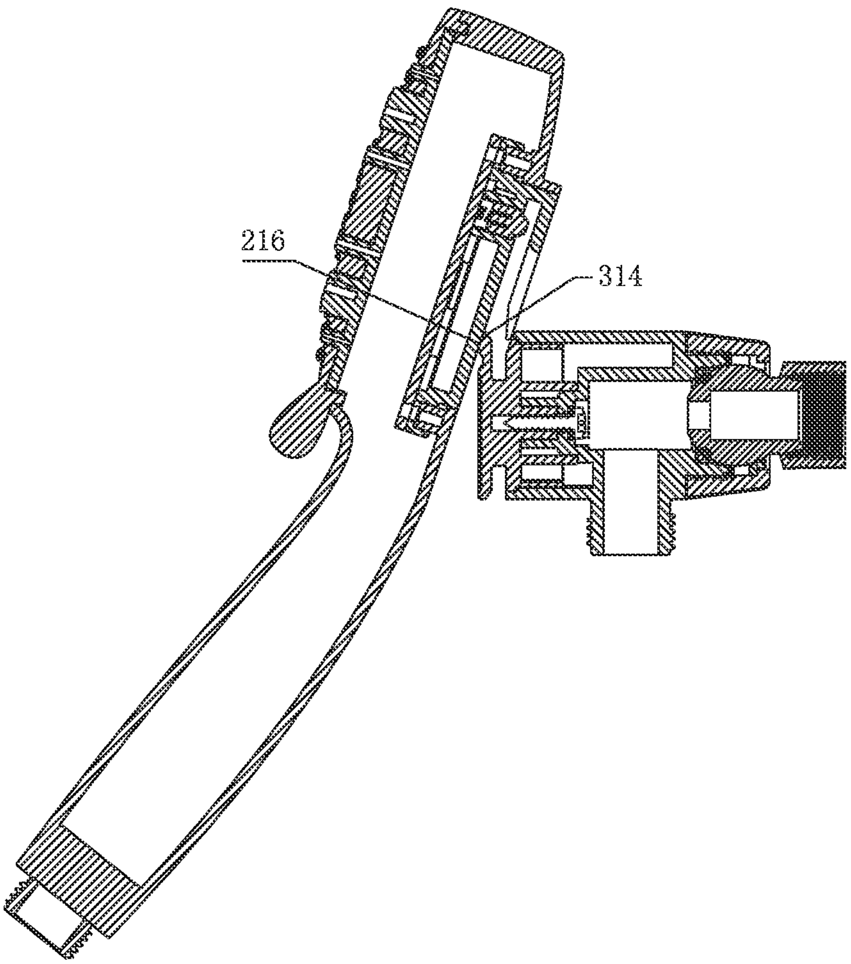
Figure 17:
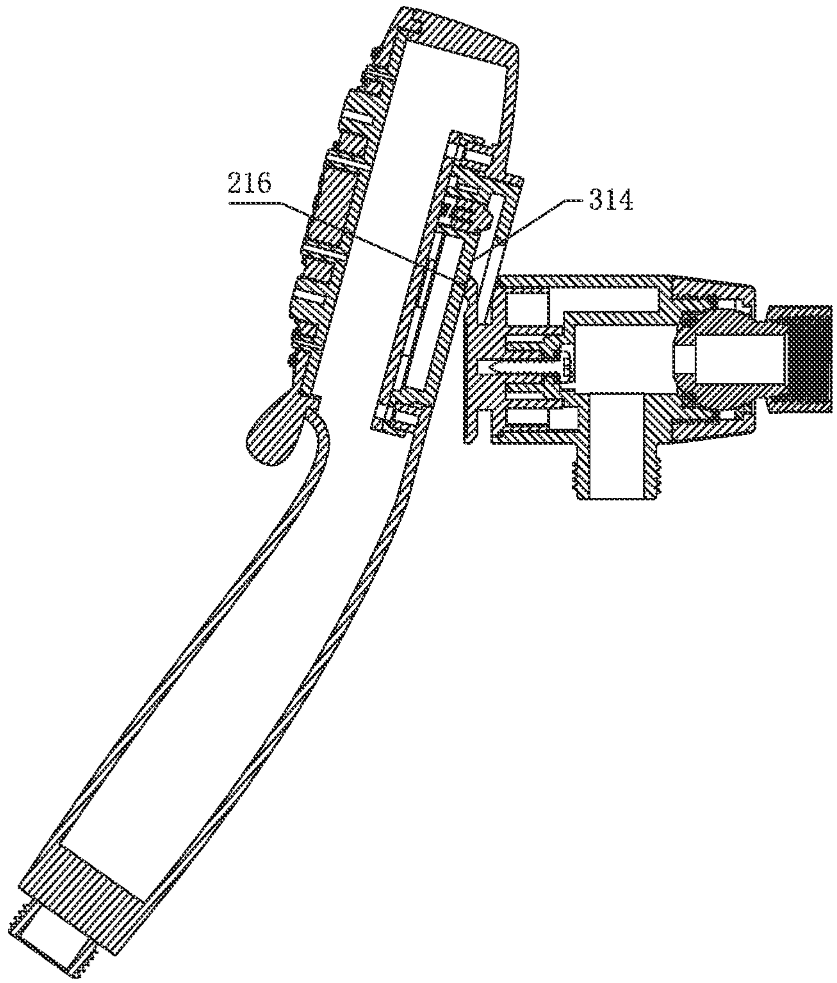
Figure 18:
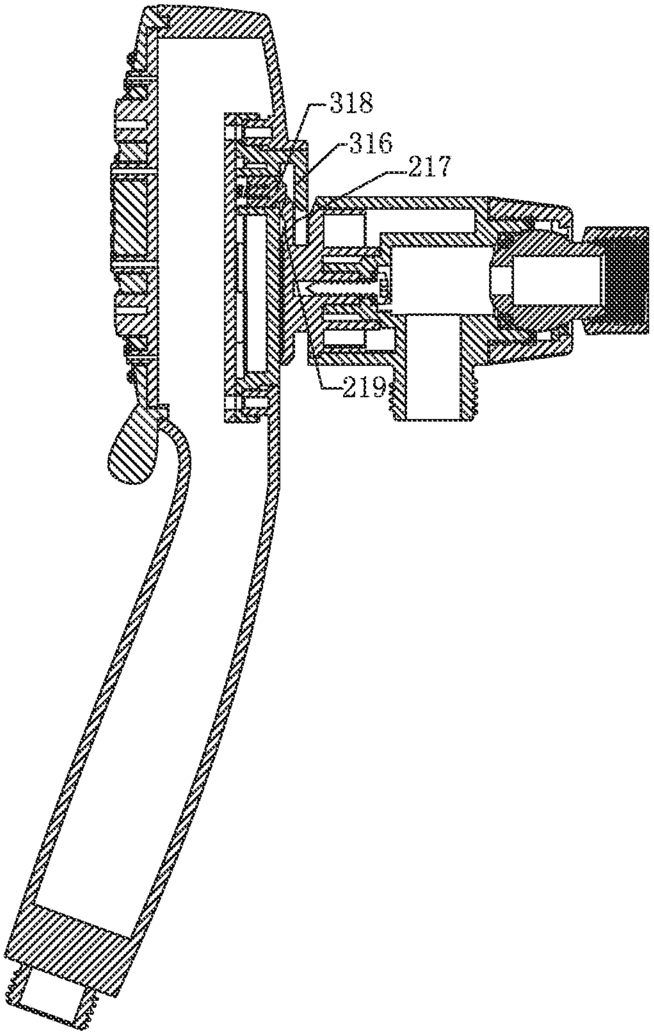
Figure 19:
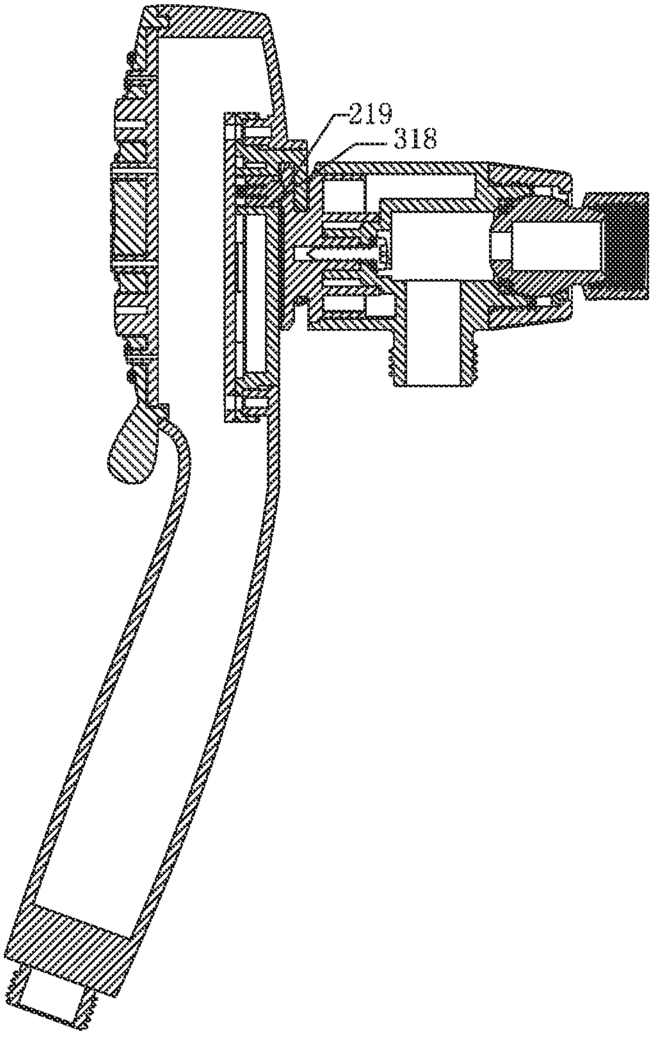

A third stage: referring to FIGS. 7, 8, and 11-13, when the handheld shower head 1 is hung in position, and the positioning hole 219 of the hanging hook 21 is coupled to the positioning pin 318 to generate a prompt sound for reminding the user that the handheld shower head 1 has been positioned. The positioning pin 318 can also restrict the handheld shower head 1 from shaking and moving upward from the hanging hook 21. When the hanging hook 21 is completely disposed into the hanging sleeve 31, an inner surface of the hanging sleeve 31 is completely attached to the hanging hook 21 (which is wedge-shaped) to achieve a guiding function, so that the handheld shower head 1 always remains vertical. Referring to FIG. 6, the hanging sleeve 31 and the hanging hook 21 respectively comprise the first straight portions 2121 and the second straight portions 3131 that cooperate with each other to prevent the rotation of the handheld shower head 1.

In this embodiment, the second hanging structure 200 is a receiving space 4, and the receiving space can be a slot.

The bracket 2 is configured to be rotatably fixed on a wall by a spherical joint 20.

When the handheld shower head 1 is disposed on the bracket 2 using the first hanging structure 100, a top of the handheld shower head 1 is at a first height, and discharging water from the handheld shower head 1 is adjusted to a side and an angle facing a user by rotating the bracket 2. When the handle 11 of the handheld shower head 1 is disposed on the bracket 2 using the second hanging structure 200, the top of the handheld shower head 1 is at a second height, and the discharging water from the handheld shower head 1 is also adjusted to the side and the angle facing the user by rotating the bracket 2. The second height is higher than the first height.

Embodiment 2

Figure 20:
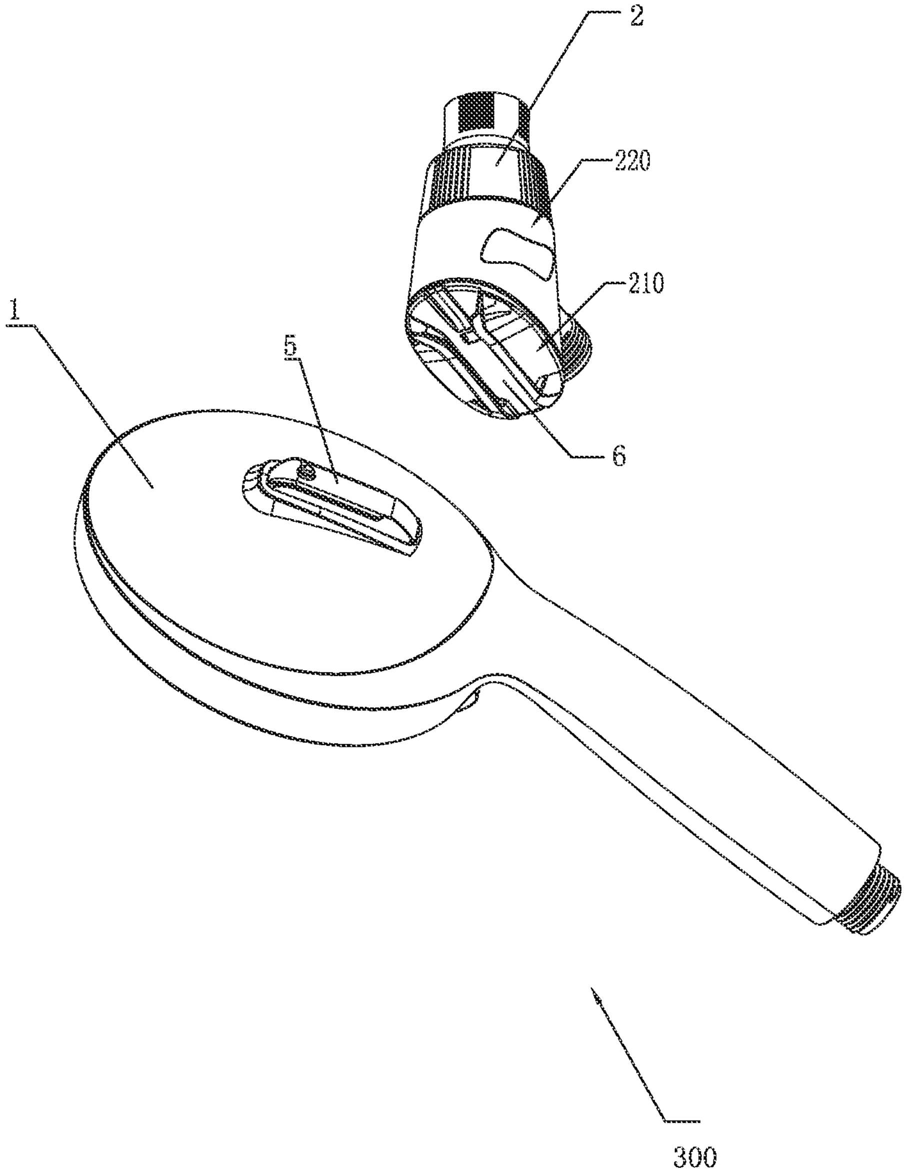
FIG. 20 illustrates a perspective view of the handheld shower head and the bracket when the handheld shower head is not hung to the bracket according to embodiment 2.
Figure 21:
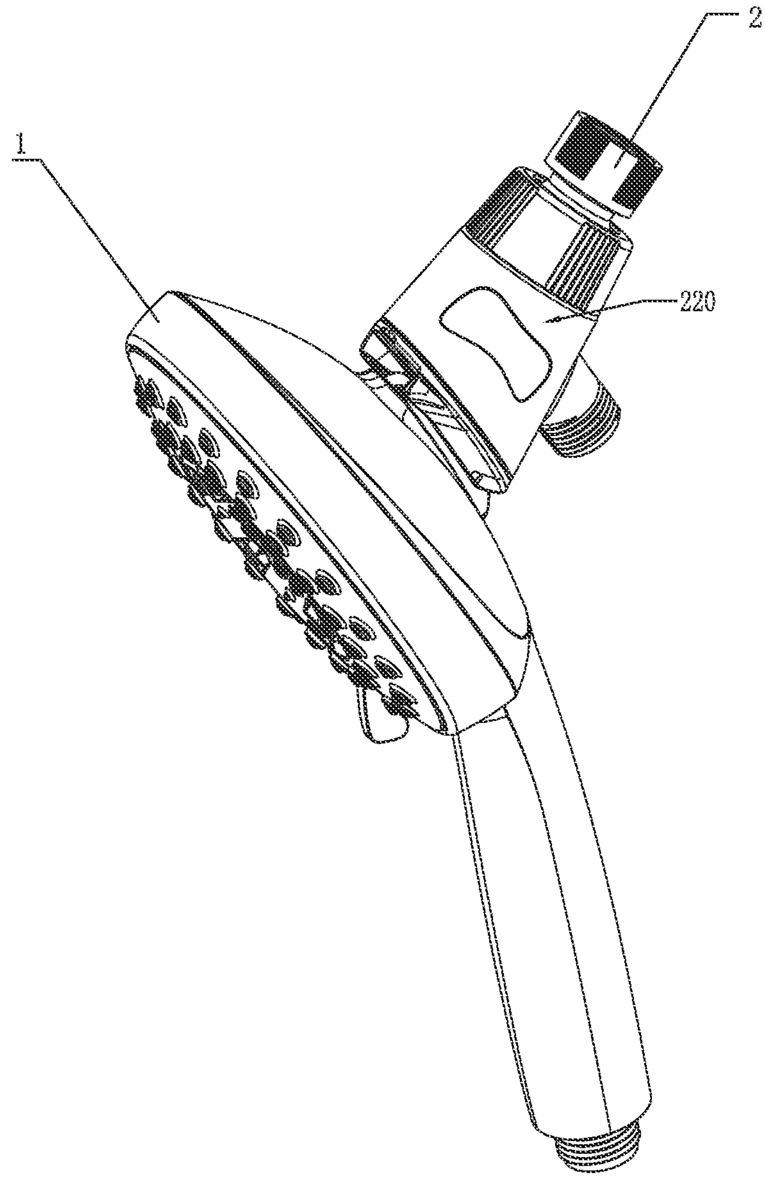
FIG. 21 illustrates a perspective view of the handheld shower head and the bracket when the handheld shower head is hung to the bracket according to embodiment 2.

Referring to FIGS. 20-21, this embodiment of the shower device 300 is similar to the embodiment 1 but has the differences described below.

The first hanging structure 100 comprises a rib 5 disposed on the back 12 of the handheld shower head 1 and a slot 6 disposed on the bracket 2.

The slot 6 has a gradually narrowed shape extending along an insertion direction of the rib 5, which guides the rib 5 to ensure the smooth progress of the hanging.

Embodiment 3

Figure 22:
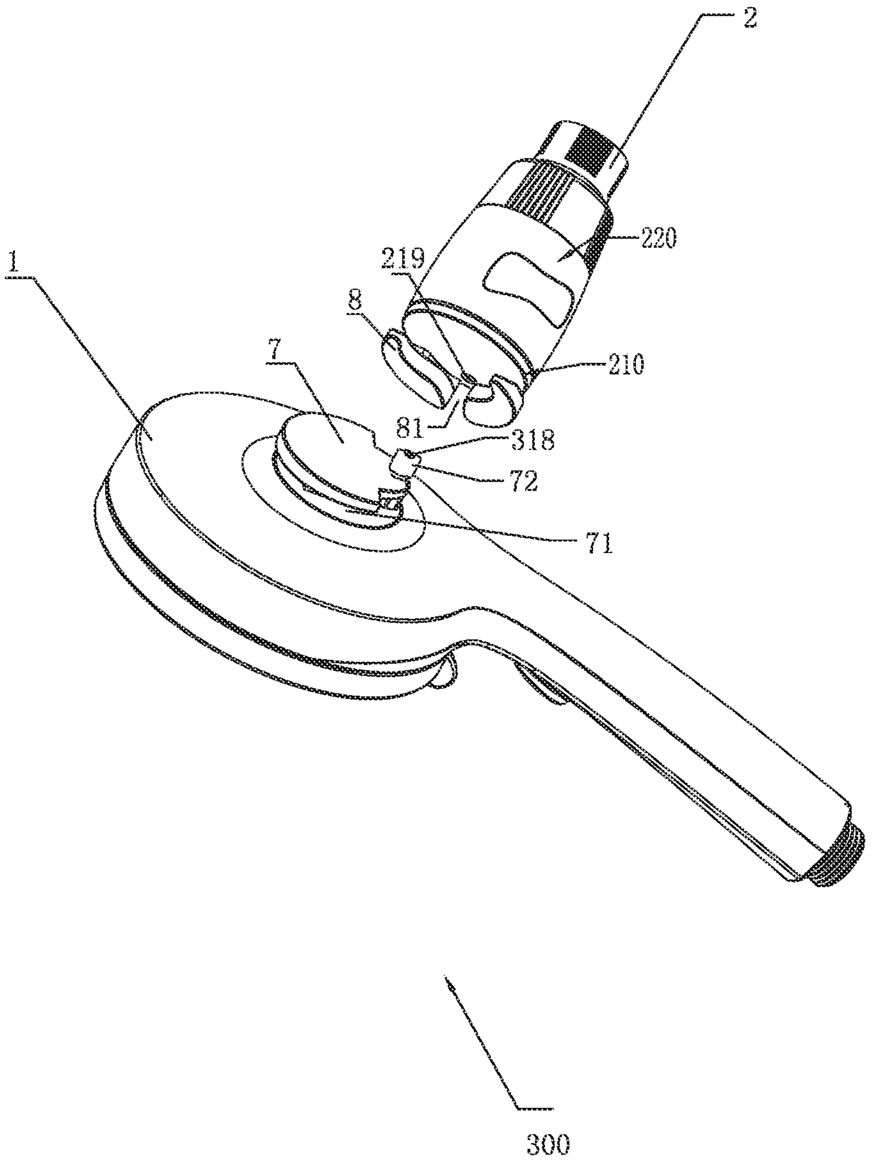
FIG. 22 illustrates a perspective view of the handheld shower head and the bracket when the handheld shower head is not hung to the bracket according to embodiment 3.
Figure 23:
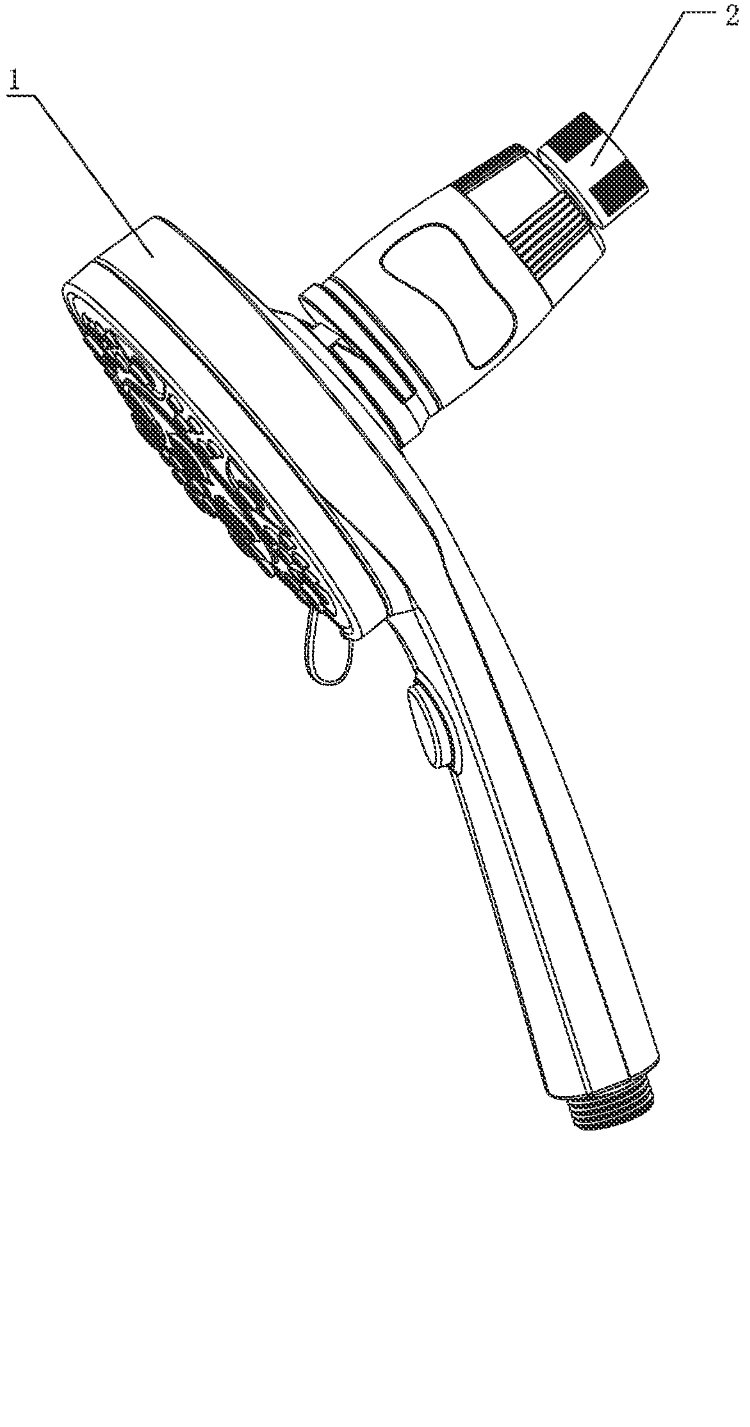
FIG. 23 illustrates a perspective view of the handheld shower head and the bracket when the handheld shower head is hung to the bracket according to embodiment 3.

Referring to FIGS. 22-23, this embodiment of the shower device 300 is similar to the embodiment 1 but has the differences described below.

The first hanging structure 100 comprises a hanging sleeve 7 disposed on the back 12 of the handheld shower head 1 and one or more hanging hooks 8 disposed on the bracket 2.

The hanging sleeve 7 comprises an arc-shaped hanging groove 71. In some embodiments, the one or more hanging hooks 8 are two hanging hooks 8 disposed on both sides of an axial direction of the arc-shaped hanging groove 71 to enable an upper end of the two hanging hooks 8 to be attached on an upper end of an inner wall of the arc-shaped hanging groove 71. This ensures that movement of the two hanging hooks 8 is limited in an insertion direction of the arc-shaped hanging groove 71

In addition, the bracket 2 comprises an inserted gap 81 disposed between the two hanging hooks 8 which are spaced apart from each other. The positioning hole 219 is disposed in the inserted gap 81, and the hanging sleeve 7 comprises a block 72 on which the positioning pin 318 is disposed.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A shower device, comprising:
- a handheld shower head,
- a bracket,
- a first hanging structure, and
- a second hanging structure, wherein:
  - the bracket is configured to be rotatably fixed on a wall by a spherical joint,
  - the first hanging structure and the second hanging structure are independent,
  - the first hanging structure is disposed between opposite sides of a back of the handheld shower head and a front surface of the bracket to enable the back of the handheld shower head to be detachably coupled to the front surface of the bracket,
  - the first hanging structure comprises a hanging sleeve and a hanging hook,
  - the bracket comprises the second hanging structure,
  - the second hanging structure comprises a receiving space for holding a handle of the handheld shower head to enable the handle to be detachably coupled to the bracket,
  - the second hanging structure is disposed on a side surface of the bracket,
  - when the handheld shower head is disposed on the bracket using the first hanging structure, a top of the handheld shower head is at a first height, and discharging water from the handheld shower head is adjusted to a side and an angle facing a user by rotating the bracket,
  - when the handle of the handheld shower head is disposed on the bracket using the second hanging structure, the top of the handheld shower head is at a second height, and the discharging water from the handheld shower head is also adjusted to the side and the angle facing the user by rotating the bracket, and
  - the second height is higher than the first height.

2. The shower device according to claim 1, wherein: the first hanging structure is further disposed on the back of the handheld shower head.

3. The shower device according to claim 1, wherein:
- the hanging sleeve is disposed on the back of the handheld shower head and the hanging hook is disposed on the bracket,
- the hanging sleeve comprises an accommodating chamber,
- a lower part of the accommodating chamber comprises an opening surface,
- a first side of the accommodating chamber facing the bracket is disposed with a baffle,
- the baffle comprises a notch extending toward a top end surface of the baffle,
- the hanging hook comprises a first portion configured to be disposed in the accommodating chamber, a second portion configured to be disposed in the notch, and a third portion connected to a side of the second portion away from the first portion,
- the second portion is disposed on a side of the first portion away from the hanging sleeve, and
- at least part of the second portion is recessed relative to the first portion and the third portion to define a groove between the first portion and the third portion.

4. The shower device according to claim 3, wherein: during a hanging process of the hanging hook and the hanging sleeve, the first portion is disposed in the accommodating chamber prior to the second portion being disposed in the notch.

5. The shower device according to claim 4, wherein:
- the at least part of the second portion that is recessed relative to the first portion and the third portion is an upper part of the second portion, and
- the groove is defined between the first portion and an upper part of the third portion.

6. The shower device according to claim 4, wherein: an upper part of the third portion is recessed with a space-providing opening for increasing an opening width of the groove.

7. The shower device according to claim 1, wherein:
- the first hanging structure comprises a rib disposed on the back of the handheld shower head and a slot disposed on the bracket, and
- the slot has a gradually narrowed shape extending along an insertion direction of the rib.

8. The shower device according to claim 1, wherein:
- the hanging sleeve is disposed on the back of the handheld shower head and the hanging hook is disposed on the bracket,
- the hanging sleeve comprises an arc-shaped hanging groove,
- an upper end of the hanging hook is attached on an upper end of an inner wall of the arc-shaped hanging groove, and
- movement of the hanging hook is limited in an insertion direction of the arc-shaped hanging groove.

9. The shower device according to claim 8, wherein:
- the first hanging structure comprises a second hanging hook, an upper end of the second hanging hook is attached on an upper end of the inner wall of the arc-shaped hanging groove, movement of the second hanging hook is limited in the insertion direction of the arc-shaped hanging groove, and the hanging hook and the second hanging hook are disposed in the arc-shaped hanging groove along both sides of an axial direction of the arc-shaped hanging groove.

10. The shower device according to claim 1, wherein:

the first hanging structure comprises a positioning pin and a positioning hole, and when the handheld shower head is hung to the bracket, the positioning pin is positionally coupled to the positioning hole.

11. The shower device according to claim 10, wherein:

the positioning pin is disposed in the hanging sleeve, and the positioning hole is disposed on the hanging hook.

12. The shower device according to claim 3, wherein:

the groove is an annular groove.

* * * * *